United States Patent [19]

McDonough et al.

[11] 4,169,692

[45] Oct. 2, 1979

[54] VARIABLE AREA TURBINE NOZZLE AND MEANS FOR SEALING SAME

[75] Inventors: Edward C. McDonough, Cincinnati; Eugene N. Tuley, Hamilton, both of Ohio

[73] Assignee: General Electric Company, Cincinnati, Ohio

[21] Appl. No.: 532,701

[22] Filed: Dec. 13, 1974

[51] Int. Cl.² ............................................. F01D 5/18
[52] U.S. Cl. .................................... 415/115; 415/160
[58] Field of Search .............. 415/129, 115, 160, 161, 415/163, 174, 173 A, 110

[56] References Cited

U.S. PATENT DOCUMENTS

| | | | |
|---|---|---|---|
| 2,021,346 | 11/1935 | Allen | 415/110 |
| 2,927,724 | 3/1960 | Wardle | 415/174 |
| 3,117,716 | 1/1964 | Wernicke | 415/173 A |
| 3,542,484 | 11/1970 | Mason | 415/160 |
| 3,551,068 | 12/1970 | Scalzo et al. | 415/115 |
| 3,601,497 | 8/1971 | Mayo | 415/163 |
| 3,674,377 | 7/1972 | Trappmann | 415/160 |
| 3,752,598 | 8/1973 | Bowers et al. | 415/115 |
| 3,767,322 | 10/1973 | Durgin et al. | 415/115 |

FOREIGN PATENT DOCUMENTS

| | | | |
|---|---|---|---|
| 195186 | 1/1958 | Austria | 415/115 |
| 971548 | 9/1964 | United Kingdom | 415/163 |

*Primary Examiner*—Stephen C. Bentley
*Attorney, Agent, or Firm*—Robert C. Lampe, Jr.; Derek P. Lawrence

[57] ABSTRACT

A cantilevered turbine vane of the variable area variety is provided with unique retaining means to prevent relative movement between the vane and a fixed turbine housing through which the vane trunnion passes. Vernier adjusting means are provided to maintain a predetermined radial clearance between the vane and the fixed turbine housing, thereby eliminating binding between the two structures.

11 Claims, 6 Drawing Figures

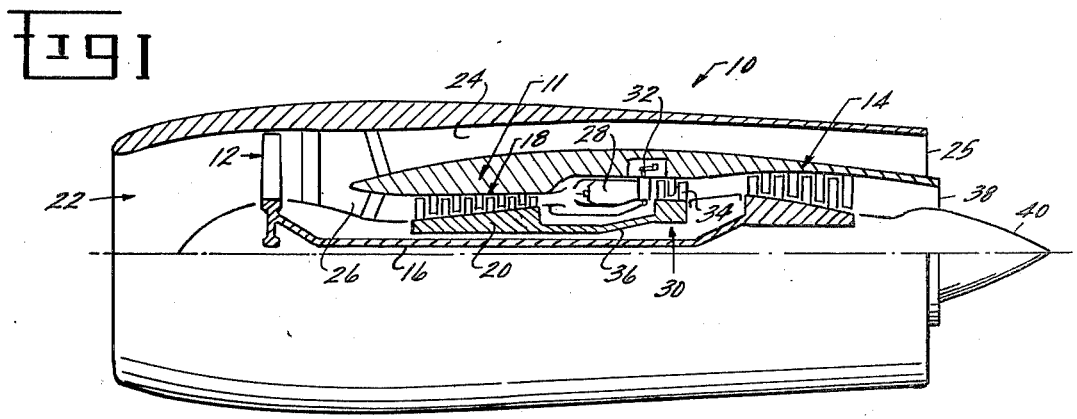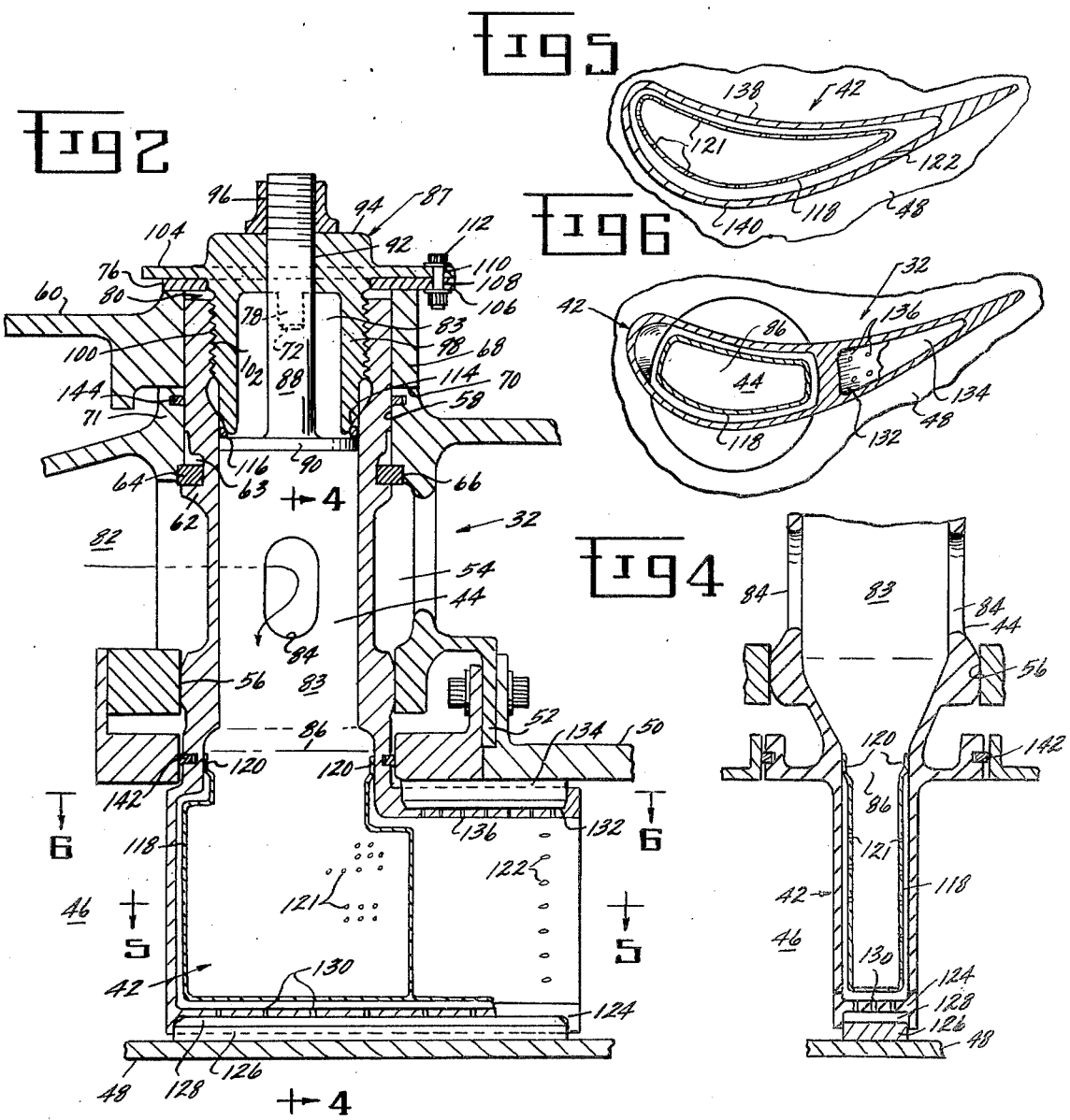

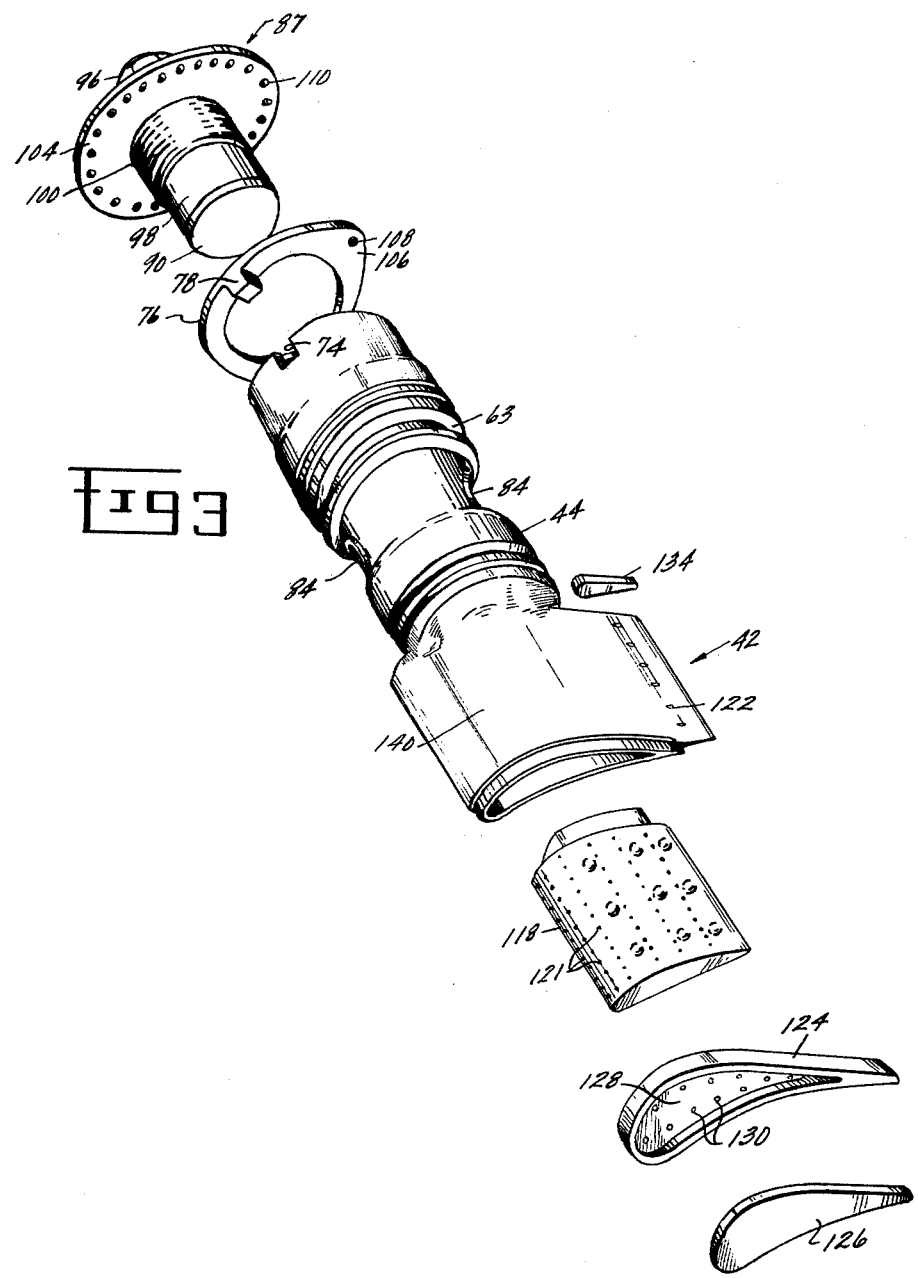

VARIABLE AREA TURBINE NOZZLE AND MEANS FOR SEALING SAME

The invention herein described was made in the course of or under a contract, or a subcontract thereunder, with the United States Department of the Air Force.

BACKGROUND OF THE INVENTION

This invention relates to turbines and, more particularly, to adjustable turbine vanes for use therein.

A dynamic machine which introduces mechanical work into a gas flow is generally called a "fan" or a "compressor", the latter term most appropriately applied to those machines which add a relatively large amount of energy per unit weight. Conversely, a dynamic machine which extracts mechanical energy from a mass or fluid flow is called a "turbine". A sophisticated dynamic machine, such as a gas turbine engine, generally includes a compressor and a turbine, the gas (usually air) being first introduced into the compressor where work is done in the form of compression. This compressed air is subsequently mixed with a highly combustible fuel and burned in a combustor section, thus considerably increasing the energy of the resultant mixture of combustion products (gases). This gas then passes to the turbine section where mechanical energy is extracted. In such a turbine, the gases pass through a stationary portion called a "vane" or, in some cases, a "stator". Where, as in a gas turbine engine, the gas paths comprise an annulus of substantially constant distance from the engine center line, the machine is called an "axial flow turbine" and the stationary part comprises a plurality of vanes, arranged as spokes of a wheel, the spokes spanning the annulus and constituting a vane stage. After the gas passes through the vane stage, it flows through a rotating stage of blades called the "rotor", or a stage of "buckets" in the particular case of a turbine. A turbine stage comprises one stationary stage of vanes and one rotating stage of buckets.

In a gas turbine engine, therefore, energy is added to the gas by the compressor and by the combustion process, while energy is extracted by turbine. The turbine bucket stage is drivingly connected, by shaft connection, to the associated rotating rotor stages of the compressor. Since the energy available to the turbine far exceeds that required to maintain the compression process, the excess is exhausted through a nozzle at the rear of the engine to produce thrust.

Advanced gas turbine engines incorporate a fan to improve subsonic performance, the fan constituting, in essence, a shrouded propeller. The fan is rotatably driven by a second turbine (or a second plurality of turbine stages) through shaft connection, the shaft being generally concentric with the aforementiond shaft connecting the first turbine and the compressor. (This second turbine is denominated the "low pressure" turbine since it drives the low pressure [compression] fan. The turbine which drives the high pressure compressor called the "high pressure" turbine.) The fan serves to pass a large volume of air around the engine thereby increasing overall engine thrust. In fact, in recent commercial fan engines, the fan moves several times as much air as is taken in by the engine compressor.

Since the fan and compressor are on separate concentric shafts and are driven by separate, axially displaced turbines, a means of regulating their relative rotating speeds is required for engine performance optimization. Further, it becomes necessary to control the relative amounts of energy added by the fan and compressor, which in turn is controlled by how much energy is extracted by their respective turbines. It can be appreciated that the faster the machinery rotates, the more air it pumps, and vice versa. It can also be appreciated that a stage of turbine vanes may function as a set of louvers, or "venetian blinds", if constructed so as to be adjustable about their longitudinal axes. Thus, by opening and closing the vane stage, the amount of flow passing therethrough can be varied, thereby modulating the energy extraction characteristics of the turbine (either the high or low pressure turbine). Further, if a stage of vanes is adjusted in the high pressure turbine, for example, the direction of the gas flow exiting that stage will also be varied. This effects the energy extraction capability of the following stage of rotating buckets, much in the way the lift of the wing changes as its orientation angle (angle of attack) is varied. If the capability of the subject high pressure turbine buckets to extract energy was thus reduced, more energy would be available to the low pressure turbine and the fan would speed up relative to the compressor. This ability to regulate the relationship between the fan speed and compressor speed is extremely important in designing the most efficient engine for many operating conditions (such as takeoff, climb, cruise, etc.).

One problem facing the designer of an adjustable vane is to develope a mounting arrangement which will position the vane radially with respect to the turbine casing and prohibit radial movement therebetween which would cause the vane to rub and bind on the turbine casing wall. It is advantageous to cantilever the vanes off the outer turbine wall since this eliminates half of the vane mounting structure, which could disrupt the fluid flow path and thereby cause aerodynamic losses and inefficiency. However, this compounds the problem of the vane mount on the outer wall since it alone must now prevent both inward and outward radial movement.

Further, as the turbine vanes are caused to move (adjusted so that the flow area is modulated) there must be sufficient clearance between the vanes and the turbine casing walls to allow for the differing thermal expansion rate of the vanes and casing, so that the vanes may be freely moved (by some actuation means) during operation of the gas turbine engine. A secondary flow of gases is thereby established from the high pressure side of the vanes to the low pressure side thereof, the path being across the end or tip of the blade through the aforementioned clearance. This secondary flow causes undesirable efficiency losses. The designer is further faced with the problem of sealing this clearance without causing vane binding during actuation, while providing a seal which will withstand the hostile, high temperature environment of a gas turbine engine turbine.

Prior state-of-the-art attempts to solve these problems have been directed toward the incorporation of simply supported, adjustable turbine vanes (supported at both ends rather than cantilevered) which invariably results in an inefficient "stepped" flow path. Typical of the simply supported vane assemblies is the patent to Thenault et al, U.S. Pat. No. 3,314,654, which is assigned to the same assignee as the present invention. Attempts at providing adequate tip sealing include flexible members affixed to the tips as typified by the U.S. patent to Willi, U.S. Pat. No. 2,776,107; "Inflatable Rubber Tubes Affixed to the Tips" as represented by Japanese Utility Model Application Publication No. 10,710/42; and, by "Internal Pressure Actuated Floating Seals" as shown in the patent to Mayo, U.S. Pat. No. 3,601,497. However, when a cantilevered vane is adopted for use in a high temperature turbine wherein the free end of the vane is proximate a hub rotating at extremely high speed, such seals cannot withstand the hot gas environment or the friction created by the rotating hub.

SUMMARY OF THE INVENTION

Accordingly, it is a primary object of this invention to provide an improved mounting structure for adjustable cantilevered vanes, wherein predetermined radial clearances between structural components may be established and maintained and wherein binding between the vane and turbine housing is eliminated.

It is a further object of this invention to provide efficient sealing means between the ends of a gas turbine vane and the surrounding casing structure, the sealing means capable of surviving in an adverse environment.

These and other objects and advantages will be more clearly understood from the following detailed description, drawings and specific examples, all of which are intended to be typical of rather than in any way limiting to the scope of the present invention.

Briefly stated, the above objects are accomplished by providing unique retaining means on both sides of a fixed turbine housing through which a cantilevered vane trunnion passes. This precludes movement in both the radially inward and outward directions. Vernier adjusting means are provided within the retaining means to produce and maintain a predetermined radial clearance between the vane assembly and the fixed turbine housing, thereby eliminating binding between the two structures. Where the airfoil is of an internally cooled variety known in the art, a floating seal is slideably mounted within a cavity at the end of the blade so as to abut the adjacent wall and provide sealing. The floating seal is forced into abutment with the wall in a piston-like fashion by the pressure of the cooling air within the vane. Impingement cooling of the seal increases its durability in the hostile environment.

DESCRIPTION OF THE DRAWING

While the specification concludes with the claims particularly pointing out and distinctly claiming the subject matter which is regarded as part of the present invention, it is believed that the invention will be more fully understood from the following description of the preferred embodiment which is given by way of example with the accompanying drawing in which:

FIG. 1 is a schematic representation of a gas turbine engine incorporating the subject invention;

FIG. 2 is a sectioned representation of a gas turbine vane constructed according to one embodiment of the subject invention;

FIG. 3 is an exploded perspective representation of the turbine vane of FIG. 2;

FIG. 4 depicts a cross-sectional view taken along line 4—4 of FIG. 2;

FIG. 5 depicts a cross-sectional view taken along line 5—5 of FIG. 2; and

FIG. 6 depicts a cross-sectional view taken along line 6—6 of FIG. 2.

DESCRIPTION OF THE PREFERRED EMBODIMENT

Referring to the drawing wherein like numerals correspond to like elements throughout, reference is initially directed to FIG. 1 wherein an engine depicted generally at 10 embodying the present invention is diagrammatically shown. This engine may be considered as comprising generally a core engine 11, a fan assembly 12 and a fan (or low pressure) turbine 14 which is interconnected to the fan assembly 12 by shaft 16. The core engine 11 includes an axial flow compressor 18 having a rotor 20. Air enters inlet 22 and is initially compressed by fan assembly 12. A first portion of this compressed air enters the fan bypass duct 24 and subequently discharges through a fan nozzle 25. A second portion of the compressed air enters inlet 26, is further compressed by the axial flow compressor 18 and then is discharged to a combuster 28 where fuel is burned to provide high energy combustion gases which drive a high pressure turbine 30 which includes alternating stages of stationary vanes 32 and rotating buckets 34. The turbine 30, in turn, drives the compressor rotor 20 through a shaft 36 in the usual manner of a gas turbine engine. The hot gases of combustion then pass to and drive the fan turbine 14 which, in turn, drives the fan assembly 12. A propulsive force is thus obtained by the action of the fan assembly 12 discharging air from the fan bypass duct 24 to the fan nozzle 25, and by the discharge of combustion gases from a core engine nozzle 38 defined, in part, by plug 40.

The above description is typical of many present-day gas turbine engines and is not meant to be limiting as it will become readily apparent from the following description that the present invention is capable of application to any turbine and is not intended to be restricted to application in gas turbine engines. The above description of the invention depicted in FIG. 1 is, therefore, merely meant to be illustrative of one type of application.

Referring now to FIGS. 2 and 3, the turbine vane assembly 32 of FIG. 1 is depicted in greater detail. For the sake of clarity, only one vane is depicted, it being representative of an entire vane stage. The vane assembly 32 is shown to include an airfoil 42 of the fluid-cooled variety, well known in the art, one end of which transits to a cylindrical-shaped trunnion 44. The airfoil is so constructed as to span an annular motive fluid passage 46 defined, in part, by a rotating inner motive fluid flow path wall 48 and an outer motive fluid flow path wall 40. Flow path wall 50 includes the radially inner surface of a rigid turbine housing or casing 52. The trunnion 44 extends through a hole 54 formed within the housing 52, thereby providing a cantilevered mounting arrangement. The aerodynamic gas flow exerted upon the airfoil 42 is reacted by forces at the rotatable bearings 56 and 58 supporting trunnion 44. Each vane assembly in the vane stage is connected to a unison ring (not shown) in the known manner by a lever means (such as a lever arm) 60 which is keyed to the vane trunnion as hereinafter explained. When the unison ring is actuated, the flow area between circumferentially adjacent airfoils is modulated.

In order to position the airfoil 42 radially to preclude binding between the airfoil 42 and walls 48 or 50, appropriate retaining means must be provided. Accordingly, a circumscribing shoulder 62 is formed upon trunnion 44 the shoulder defining, in part, a radially adjacent groove 63. Before the trunnion is seated in the housing 52, a washer 64 preferably of the split variety is assembled into groove 63 and into abutting relationship with shoulder 62. As the trunnion is then seated within bearings 56 and 58, the washer slides into a counter-bored recess 66 in housing 52. The split washer is thus captured by the housing 52 and trunnion 44 so that it cannot separate. Any attempt to move the airfoil radially outwardly is prevented by the abutting relationship of shoulder 62, washer 64 and groove 66.

Appropriate means are also provided to prevent airfoil movement in the radially inward direction. A portion 68 of lever arm 60 is adapted to circumscribe trunnion 44 and is so assembled as to interface at 70 with a boss 71 formed upon the radially outward side of turbine housing 52. The lever arm has a slot 72 formed within that portion 68 which circumscribes the trunnion, the slot 72 so formed as to be aligned with a corresponding slot 74 (FIG. 3) on the end of trunnion 44 when the lever arm 60 and airfoil 42 are in a predetermined relationship. This relationship is maintained by assembling a keyed washer 76 over the end of trunnion 44 such that key 78 engages cooperating slots 72 and 74 which form a keyway. It is apparent from FIG. 2 that a gap 80 exists between the end of trunnion 44 and keyed washer 76. While this gap is not essential, as will soon be readily apparent, trunnion 44 should not extend radially outwardly of lever arm portion 68.

Since airfoil 42 is of the fluid-cooled variety (the fluid usually comprising air) means are required to route the cooling air from its source, such as the discharge of compressor 18, to the airfoil. Thus, a passage 82 is formed within housing 52 to carry cooling air from its source to trunnion 44. The trunnion is hollow, having a bore passage 83 formed therein, and in fluid communication with passage 82 by means of at least one aperture 84 within trunnion 44. The trunnion is further in communication with airfoil 42 through opening 86 (FIG. 4).

A cap assembly 87 is provided to constrain the airfoil from radially inward movement and to seal the bore cavity at the radially outward end of trunnion 44. The cap assembly includes a center post 88, the shank of which preferably is of rectangular or square cross section to provide an internal wrenching capability for the center post 88, and which has a flange portion 90 formed upon one end thereof. The center post is disposed within bore 83 such that flange 90 substantially fills the passage. Center post 88 protrudes through an opening 92 of a flanged cap 94 and is retained in position by means of threaded connection with a nut 96.

A cylindrical base 98 of flanged cap 94 is screwed into passage 83 and retained therein by cooperating threads 100 and 102. Flange 104 is thus brought to bear upon keyed washer 76 and lever arm 60. As a result, movement is restrained in the radially outward direction. Further, cooperating threads 100 and 102 serve as vernier adjusting means to establish a predetermined radial clearance at the inter-face 70 of lever arm portion 68 and boss 71 to eliminate binding therebetween.

As depicted in FIG. 3, keyed washer 76 has formed thereon an elongated tab portion 106 with a small hole 108 formed therethrough. Flange 104 includes a plurality of holes 110 about its circumference, one of which will be in substantial alignment with hole 108 when the predetermined clearance at interface 70 is established. An appropriate retainer is inserted into the cooperating holes 108 and 110 to preclude relative motion between threads 100 and 102. A bolted connection 112 is depicted in FIG. 2, though it is recognized that other means, such as cotter pins, may be employed. To further preclude the leakage of cooling air past cap 104, its cylindrical base 94 has a beveled face 114 formed upon its radially inward end, facing trunnion 44. A deformable seal 116 is placed in the depression formed between beveled face 114 and flange 90 prior to threading the cap assembly 86 into trunnion 44. Thereafter, the seal is captured between the trunnion 44, beveled face 114 and flange 90. By turning nut 96, the flange 90 squeezes seal 116 such that it forms a complete seal between trunnion 44 and cap base 98, thereby precluding the flow of cooling fluids therebetween.

Referring now to FIGS. 2, 4 and 5, in order to effect the required cooling of the airfoil 42, a thin sheet metal insert 118 is placed inside the hollow airfoil. To position the insert 118 in the airfoil, it is brazed or otherwise bonded to the airfoil as at 120, thereby forming an air seal. The insert 118 contains a plurality of holes 121 to provide impingement cooling of airfoil 42 in the known manner. The majority of the cooling air then passes through film cooling slots 122 on the airfoil surface, also in a manner well known in the art (FIG. 5). To enclose the insert 118 in the airfoil, an airfoil-shaped tip cap 124 is welded or bonded to the airfoil.

Sealing between the airfoil 42 and flow path wall 48 is accomplished by a close-fitting floating seal 126. As depicted in FIGS. 2, 3 and 4, the floating seal 126 comprises, preferably, an airfoil contour and is so constructed as to be slidingly received within a similarly shaped cavity 128 formed within tip cap 124. The cavity 128 is fluidly connected to the cooling air within airfoil 42 by means of cooling holes 130. Thus, the cooling air within the airfoil serves two additionally useful functions: it provides the motive force to push seal 126 into abutting relationship with wall 48 in the manner of a piston and it provides impingement cooling of seal 126. It can be appreciated that due to the broad area of the seal exposed to the wall 48, and the added benefit of impingement cooling, the seal is capable of longer life in the hostile environment of the turbine.

A similar second sealing means may be provided between the airfoil 42 and the turbine housing 52 as depicted in FIGS. 2 and 6. Depicted therein, a cavity 132 is formed within the airfoil, the cavity adapted to slidingly receive a second floating seal 134. As in the manner of the first seal 126, cooling holes 136 are provided for fluid communication with the interior of airfoil 42 to provide the necessary piston action and impingement cooling of seal 134. Thus, seals 126 and 134 are actuated by air pressure within the airfoil and are thus maintained in contact with the end walls 48 and 50, respectively, to prevent cross flow leakage or secondary flow from the pressure side 138 to the suction side 140 of the airfoil 42.

If necessary, additional conformable piston ring-type seals, such as at 142 and 144, may be provided to prevent leakage of hot gases from the fluid annulus 46 to the bearings 56 and 58.

It should be obvious to one skilled in the art that certain changes can be made to the above-described invention without departing from the broad inventive concepts thereof. For example, there may be situations wherein the cap assembly could be formed of a single piece; either one or both of the floating seals might be deleted in certain applications; and the vane assembly need not be of the air-cooled variety in order to effectively utilize the novel retaining means herein discussed.

Further, as hereinbefore discussed, the subject invention is not limited only to turbines incorporated in gas turbofan engines, but is equally applicable to all turbomachinery, including compressors and turbines. It is intended that the appended claims cover these and all other variations in the present invention's broader inventive concepts.

What is claimed is:

1. A vane assembly comprising:
   a rigid casing having a hole therethrough;
   an airfoil, one end of which transists to a generally cylindrical trunnion received within the hole, the trunnion being provided with a bore passage at an end opposite said airfoil;
   lever means for adjusting airfoil pitch;
   means for keying said lever means to the trunnion;
   a cap retained by means of a threaded connection within the trunnion bore passage, said cap entrapping said lever means between said casing and said cap; and
   retaining means for limiting the radially outward movement of said trunnion.

2. The vane assembly of claim 1 wherein said housing comprises an essentially cylindrical turbine casing having a boss formed upon the radially outward side thereof.

3. The vane assembly of claim 1 wherein said retaining means includes:
   a shoulder formed about said trunnion; and
   a washer circumscribing said trunnion in abutting relationship between said shoulder and the radially inward side of said housing, thereby substantially precluding radially outward movement of said trunnion.

4. The retaining means of claim 3 wherein said washer is segmented.

5. The vane assembly of claim 3 wherein said washer is retained in a recess formed within said casing.

6. The vane assembly of claim 1 further comprising:
   a flange formed upon said cap; and wherein said keying means is captured between said flange and said lever means, thereby precluding substantial radially inward movement of said vane assembly, said keying means engaging cooperating slots formed in said lever means and said trunnion.

7. The vane assembly of claim 6 wherein:
   the bore passage extends the length of said trunnion;
   said airfoil is of the fluid-cooled variety; and
   said bore passage is in fluid communication with said airfoil and a source of cooling fluid.

8. The vane assembly of claim 7 further comprising a generally cylindrical inner wall coannular with said casing to define a motive fluid flow path therebetween and floating seal means disposed between said airfoil and said inner motive fluid flow path wall.

9. The vane assembly of claim 1 further including locking means to preclude rotation between said cap and said trunnion at their threaded connection.

10. The vane assembly of claim 1 further including:
    a center post having a shank portion with a flange portion formed upon one end thereof, said center post disposed within said bore passage such that said post flange substantially fills said bore passage and said shank protrudes through an aperture formed within said cap;
    a comformable seal disposed between said cap and said post flange; and
    means for squeezing said seal between said cap and said post flange, thereby substantially precluding the flow of cooling fluid from said bore passage and through said cap.

11. The vane assembly of claim 1 further comprising floating seal means disposed between said airfoil and the inner side of said casing.

* * * * *